US011644605B2

(12) United States Patent
Takeda et al.

(10) Patent No.: US 11,644,605 B2
(45) Date of Patent: May 9, 2023

(54) POLARIZING ELEMENT HAVING ALTERNATELY LAMINATED DIELECTRIC LAYERS AND CONDUCTIVE LAYERS AND METHOD FOR MANUFACTURING POLARIZING ELEMENT

(71) Applicant: DEXERIALS CORPORATION, Tokyo (JP)

(72) Inventors: Tomu Takeda, Tome (JP); Hideto Sagawa, Tome (JP)

(73) Assignee: DEXERIALS CORPORATION, Tochigi (JP)

( * ) Notice: Subject to any disclaimer, the term of this patent is extended or adjusted under 35 U.S.C. 154(b) by 208 days.

(21) Appl. No.: 16/686,897

(22) Filed: Nov. 18, 2019

(65) Prior Publication Data
US 2020/0158933 A1 May 21, 2020

(30) Foreign Application Priority Data

Nov. 19, 2018 (JP) .............................. JP2018-216638

(51) Int. Cl.
*G02B 1/18* (2015.01)
*G02B 5/30* (2006.01)
(Continued)

(52) U.S. Cl.
CPC ............. *G02B 5/3058* (2013.01); *G02B 1/18* (2015.01); *G02F 1/133548* (2021.01); *G02B 5/285* (2013.01)

(58) Field of Classification Search
CPC .................... G02B 5/3058; G02F 1/133548
See application file for complete search history.

(56) References Cited

U.S. PATENT DOCUMENTS

2008/0186576 A1* 8/2008 Takada ................. G02B 5/3025
359/487.03
2015/0116824 A1 4/2015 Wang et al.
(Continued)

FOREIGN PATENT DOCUMENTS

| CN | 105378520 | 3/2016 |
| JP | 2004280050 A | 10/2004 |

(Continued)

OTHER PUBLICATIONS

"Chinese Application Serial No. 201911066507.6, Office Action dated May 27, 2022", w English Translation, (May 27, 2022), 15 pgs.
(Continued)

*Primary Examiner* — Ryan S Dunning
(74) *Attorney, Agent, or Firm* — Schwegman Lundberg & Woessner, P.A.

(57) ABSTRACT

A polarizing element has a wire grid structure, and includes a transparent substrate, and projections, which are arrayed on the main surface of the substrate at a pitch p40 that is narrower than the wavelength of the light in the used light region, and extend along the Y-direction. The projections have a laminated structure in which two or more sets of a dielectric layer and a conductive layer are laminated alternately along the Z-direction. The conductive layers include a first conductive layer having absorption properties relative to the light in the used light region and a second conductive layer having reflective properties relative to the light in the used light region. The first conductive layer is provided as the conductive layer closest to the incident side of the light.

16 Claims, 14 Drawing Sheets

(51) Int. Cl.
*G02F 1/1335* (2006.01)
*G02B 5/28* (2006.01)

(56) References Cited

U.S. PATENT DOCUMENTS

| | | | | |
|---|---|---|---|---|
| 2015/0131150 A1* | 5/2015 | Probst | ............... | G02B 1/12 |
| | | | | 359/485.05 |
| 2016/0131810 A1* | 5/2016 | Takada | ............ | G02B 5/3041 |
| | | | | 359/487.06 |
| 2018/0299602 A1 | 10/2018 | Takeda et al. | | |

FOREIGN PATENT DOCUMENTS

| | | |
|---|---|---|
| JP | 4152645 B2 | 7/2008 |
| JP | 2008216957 A | 9/2008 |
| JP | 2010066571 A | 3/2010 |
| JP | 2015034985 A | 2/2015 |
| JP | 5960319 B1 | 7/2016 |
| JP | 6230689 B1 | 10/2017 |
| JP | 2018511816 A | 4/2018 |
| WO | WO-2017073044 A1 | 5/2017 |

OTHER PUBLICATIONS

"Japanese Application Serial No. 2018-216638, Office Action dated Sep. 6, 2022", w/English Translation, (Sep. 6, 2022), 12 pgs.

* cited by examiner

|  | BLUE WAVELENGTH REGION (430 TO 510 nm) | GREEN WAVELENGTH REGION (520 TO 590 nm) | RED WAVELENGTH REGION (600 TO 680 nm) |
|---|---|---|---|
| EXAMPLE 1 | 90.2 | 93.0 | 92.6 |
| EXAMPLE 2 | 90.4 | 92.5 | 91.9 |
| EXAMPLE 3 | 90.4 | 91.8 | 91.0 |
| EXAMPLE 4 | 90.7 | 91.6 | 90.7 |
| COMPARATIVE EXAMPLE | 89.8 | 90.1 | 89.5 |

POLARIZING ELEMENT HAVING ALTERNATELY LAMINATED DIELECTRIC LAYERS AND CONDUCTIVE LAYERS AND METHOD FOR MANUFACTURING POLARIZING ELEMENT

BACKGROUND OF THE INVENTION

Field of the Invention

The present invention relates to a polarizing element, a method for manufacturing a polarizing element, and an optical apparatus.

Priority is claimed on Japanese Patent Application No. 2018-216638, filed Nov. 19, 2018, the content of which is incorporated herein by reference.

Description of Related Art

A polarizing element is an optical element that absorbs light that is polarized in one direction parallel to the element surface and transmits light that is polarized in a direction parallel to the element surface and orthogonal to the above one direction. Polarizing elements are used in liquid crystal display devices. In particular, in liquid crystal display devices that use a light source having a large luminous energy, such as transmissive liquid crystal projectors, the polarizing element is exposed to powerful radiation. As a result, the polarizing element requires excellent heat resistance and light resistance. Further, the polarizing element must be able to be formed in a size of about several cm, and also requires a high extinction ratio and an ability to control the reflectance characteristics. Wired grid inorganic polarizing elements have been proposed as examples of polarizing elements capable of meeting these requirements.

A wire grid polarizing element has a structure in which a multitude of wires that extend in one direction are arranged on a substrate at a pitch that is narrower than the wavelength of the light being used. The wires are formed from a conductor, and function as a reflective layer for the light being used. The pitch of the wires is from several tens of nm to about several hundred nm. Light that is polarized parallel to the direction of extension of the wires is TE waves or S-waves, and TE wave light cannot pass through the wire grid polarizing element. In contrast, light that is polarized in a direction perpendicular to the direction of extension of the wires is TM waves or P-waves, and if TM wave light is irradiated onto the wire grid polarizing element, the light is transmitted.

Wire grid polarizing elements having the structure outlined above exhibit excellent heat resistance and light resistance. Further, by using existing film formation and etching technology, comparatively large elements can be produced. Furthermore, wire grid polarizing elements have a high extinction ratio. Moreover, by constructing the wires with a laminated structure having a dielectric layer and a metal layer, the reflectance characteristics of the wire grid polarizing element can be controlled.

Return light that is reflected at the surface of wired grid polarizing element is reflected again inside the liquid crystal projector. As a result, ghosting occurs. By using a wire grid polarizing element having the types of superior characteristics and functions described above, image degradation caused by ghosting and the like can be suppressed.

In a conventional wire grid polarizing element, as is evident from the relationship between the pitch and the grid width, as the wavelength is shortened, the light transmittance decreases. The grid width means the size of the wire in the direction parallel to the surface of the substrate and perpendicular to the direction of extension of the wire. For example, in the visible light region used in a liquid crystal projector, if the blue region is deemed to be from 430 nm to 510 nm, the green region is deemed to be from 520 nm to 590 nm, and the red region is deemed to be from 600 nm to 680 nm, then the light transmittance is lowest in the blue region.

It is known that by narrowing the grid width of a wire grid polarizing element, the light transmittance can be enhanced, but actually forming a pattern having a narrowed grid width as designed is very difficult, and variations during manufacture tend to occur readily. Further, narrowing the grid width makes it difficult to maintain the reliability of the manufactured polarizing elements.

Wire grid polarizing elements of various structures have been proposed in order to address the issues described above. For example, Japanese Patent (Granted) Publication No. 5960319, International Patent Publication No. 2017/073044 and Japanese Patent (Granted) Publication No. 6230689 disclose polarizing elements having lattice-like projections arranged on a transparent substrate at a pitch that is smaller than the wavelength of the light in the used light region. The lattice-like projections of the polarizing elements in Japanese Patent (Granted) Publication No. 5960319, International Patent Publication No. 2017/073044 and Japanese Patent (Granted) Publication No. 6230689 have a reflective layer, a dielectric layer and an absorption layer provided in that order from the transparent substrate side. The tip portions of the lattice-like projections of the polarizing element of Japanese Patent (Granted) Publication No. 5960319 are sloped so as to narrow toward the tip. The width of the lattice-like projections of the polarizing element of International Patent Publication No. 2017/073044 is uniform. The reflective layer of the polarizing element of International Patent Publication No. 2017/073044 has a metal layer and an oxide layer that covers the side surfaces of the metal layer. In the lattice-like projections of the polarizing element of Japanese Patent (Granted) Publication No. 6230689, the width of the reflective layer is smaller than the width of the dielectric layer.

Japanese Patent (Granted) Publication No. 4152645 discloses a polarizing element containing a substrate having a surface, and an array of parallel and elongated wire preforms provided on the surface. Each of the wire preforms of the polarizing element of Japanese Patent (Granted) Publication No. 4152645 is arranged with a grid period that is smaller than the wavelength of the incident light, and contains an intrawire substructure composed of alternating elongated metal wires and elongated dielectric layers. The intrawire substructure contains at least two elongated metal wires.

SUMMARY OF THE INVENTION

The one direction mentioned above, namely the axis in the direction along which the wires extend, is called the absorption axis. The axis in the direction orthogonal to the above one direction is called the transmission axis. In recent years, as the brightness of liquid crystal projectors has increased, there has been a growing demand for polarizing elements having a high transmittance of light polarized along the transmission axis and having a low reflectance of light polarized along the absorption axis. In the polarizing element of Japanese Patent (Granted) Publication No. 4152645, the reflectance of light polarized along the absorption axis increases. Accordingly, if the polarizing element of Japanese Patent (Granted) Publication No. 4152645 is used in a liquid crystal projector, then a problem arises in that light that is reflected back to the incident side at the polarizing element becomes stray light, and causes a deterioration in the optical characteristics of the liquid crystal projector.

The present invention has been developed in light of the above circumstances, and provides a polarizing element that exhibits a high transmittance of light polarized along the transmission axis and a low reflectance of light polarized along the absorption axis, as well as a method for manufacturing the polarizing element and an optical apparatus.

A polarizing element of the present invention is a polarizing element having a wire grid structure, and includes a transparent substrate, and projections, which are arrayed on the surface of the transparent substrate at a pitch that is narrower than the wavelength of the light in the used light region, and extend in a first direction along the surface, wherein the projections have a laminated structure in which a plurality of sets of a first dielectric layer and a conductive layer are laminated alternately along a second direction orthogonal to the surface, the conductive layers include a first conductive layer having absorption properties relative to the light and a second conductive layer having reflective properties relative to the light, and the first conductive layer is provided as the conductive layer closest to the incident side of the light.

In the polarizing element described above, the projections may have a second dielectric layer that covers the apical surface and the side surfaces of the laminated structure.

In the polarizing element described above, the number of conductive layers in the projections may be 7 or greater.

In the polarizing element described above, the projections may have a substantially rectangular shape when viewed from the first direction.

In the polarizing element described above, the first dielectric layer and the conductive layer may each have a substantially rectangular shape when viewed from the first direction.

In the polarizing element described above, the material of the second conductive layer may be a metal, and the metal may be aluminum or an aluminum alloy.

In the polarizing element described above, the material of the transparent substrate may be any one of glass, rock crystal and sapphire.

In the polarizing element described above, the material of the first dielectric layer and the second dielectric layer may be a silicon oxide.

In the polarizing element described above, the first conductive layer may contain silicon, as well as iron or tantalum.

In the polarizing element described above, the surface of the transparent substrate and the apical surface and side surfaces of the projections may be coated with an organic water-repellent film.

A method for manufacturing a polarizing element according to the present invention is a method for manufacturing a polarizing element having a wire grid structure, the method including a step of forming a laminated structure composed of alternating layers of a dielectric layer and a conductive layer on a transparent substrate, a step of selectively etching the laminated structure to form projections that are arrayed on the transparent substrate at a pitch that is narrower than the wavelength of the light in the used light region, a step of embedding the projections within a dielectric material, and a step of selectively etching the dielectric material to form projections that are arrayed on the transparent substrate at a pitch that is narrower than the wavelength of the light in the used light region.

An optical apparatus of the present invention includes the polarizing element described above.

The present invention is able to provide a polarizing element that exhibits a high transmittance of light polarized along the transmission axis and a low reflectance of light polarized along the absorption axis, a method for manufacturing the polarizing element that enables this type of polarizing element to be manufactured, and an optical apparatus that incorporates a polarizing element having a high transmittance of light polarized along the transmission axis and a low reflectance of light polarized along the absorption axis.

PREFERRED EMBODIMENTS

Embodiments of the present invention are described below with reference to the drawings.

[Structure of Polarizing Element of One Embodiment]

Figure 1:
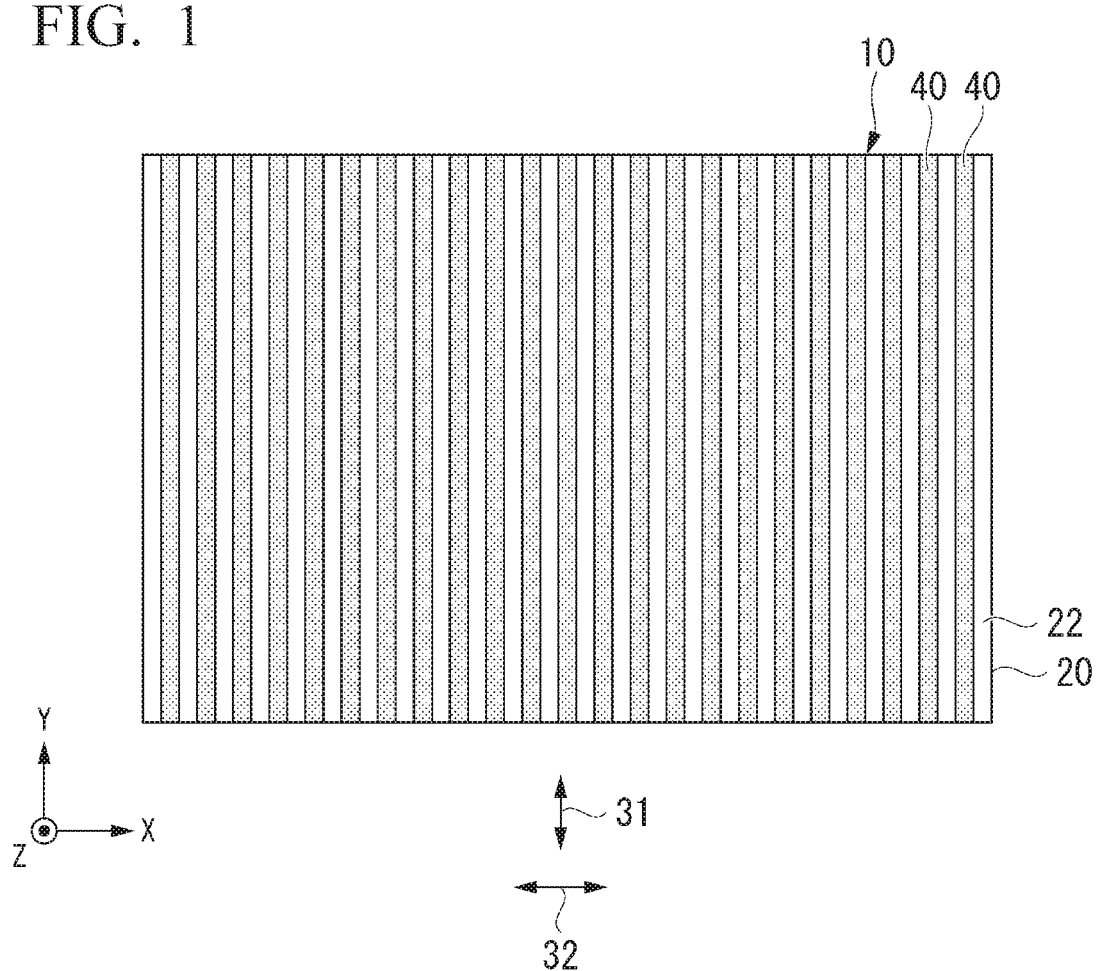
FIG. 1 is a plan view of a polarizing element of a first aspect of the present invention.

FIG. 1 is a plan view of a polarizing plate (polarizing element) 10 of one embodiment of the present invention. As illustrated in FIG. 1, the polarizing plate 10 includes a transparent substrate 20 and a plurality of projections 40. The projections 40 extend in a first direction across the main surface (the surface) 22 of the transparent substrate 20. Hereafter, the direction in which the plurality of projections 40 are arrayed across the main surface 22 is deemed the X-direction. The direction along which the projections 40 extend is deemed the Y-direction (the first direction). The direction that is orthogonal to both X-direction and the Y-direction, and that is oriented in the direction from the tip of the projections 40 protruding from the main surface 22 to the main surface 22 is deemed the Z-direction (the second direction).

Light is incident on the polarizing plate 10 in the direction along the Z-direction, from the side of the projections 40 and the main surface 22. Polarized light having an electric field component parallel to the Y-direction is called TE waves or S-waves. On the other hand, polarized light having an electric field component parallel to the X-direction is called TM waves of P-waves. As a result of the four effects of transmission, reflection, interference, and selective absorption of polarized light due to optical anisotropy, the polarizing plate 10 attenuates the incident TE waves and transmits the incident TM waves. Accordingly, an absorption axis 31 of the polarizing plate 10 is oriented along the Y-direction. A transmission axis 32 of the polarizing plate 10 is oriented along the X-direction.

In the following description, the term "height" means the dimension along the Z-direction from the main surface 22. The term "width" means the dimension along the X-direction when viewed from the Y-direction. The term "pitch" means the plurality of repeated intervals in the X-direction when viewed from the Y-direction. That is, the term "pitch" means the total dimension of one projection 40 and one concave adjacent to the one projection 40 in the X-direction when viewed from the Y-direction.

Figure 2:
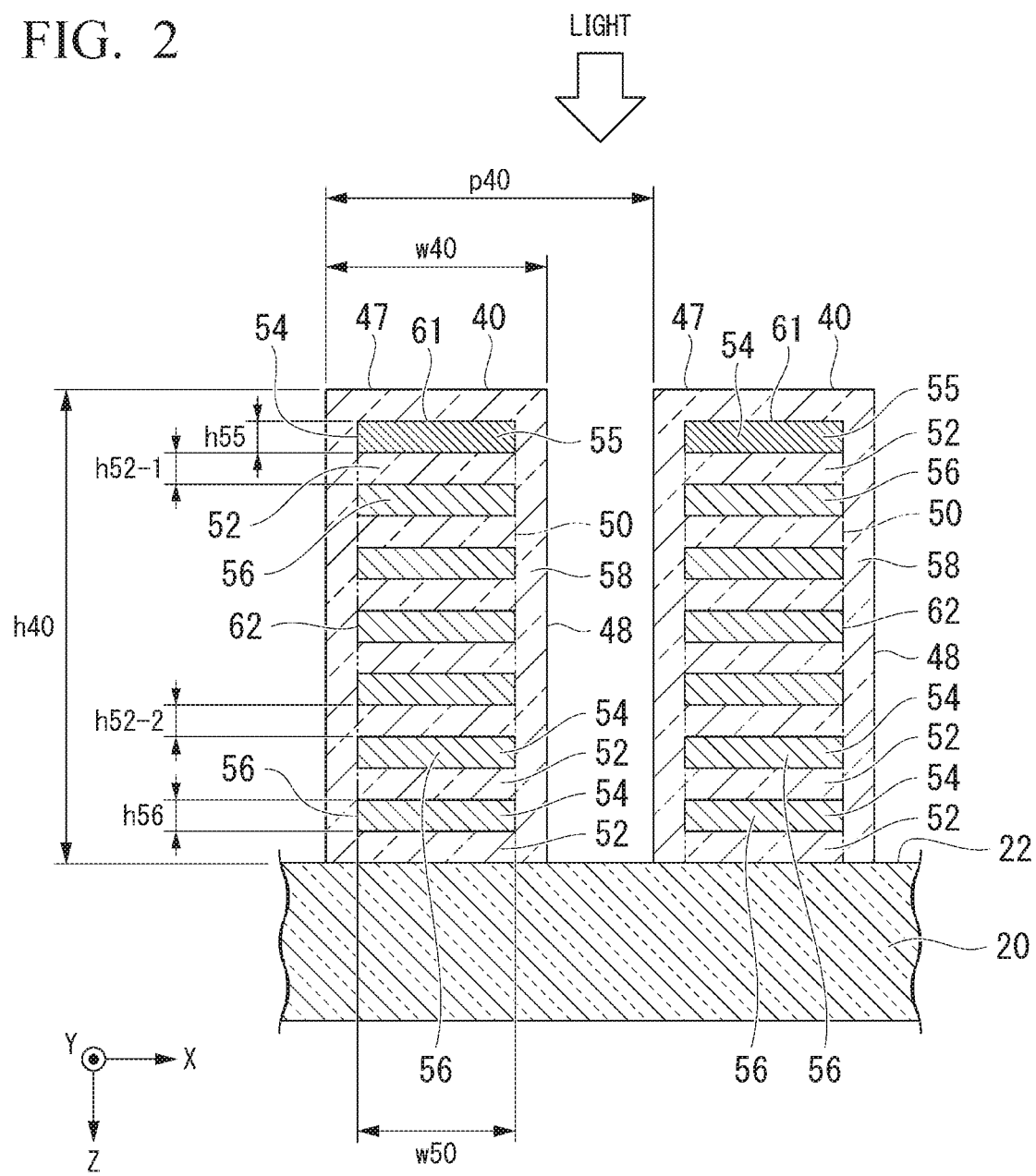
FIG. 2 is a cross-sectional view of a portion of the polarizing element illustrated in FIG. 1 cut through a plane including the X-direction and the Z-direction.

FIG. 2 is a cross-sectional view of a portion of the polarizing plate 10 cut through a plane including the X-direction and the Z-direction. As illustrated in FIG. 2, the plurality of projections 40 are arrayed across the main surface 22 at a pitch p40 that is shorter than the wavelength of the light in the used light region.

The transparent substrate 20 is a substrate that exhibits transparency relative to the light of the used light region. The height of the transparent substrate 20 is, for example, at least 0.3 mm but not more than 1 mm, but there are no particular limitations on this height, provided the transmittance of light polarized along the transmission axis 32 of the polarizing plate 10 and the absorption of light polarized along the absorption axis 31 can both be favorably maintained.

The projections 40 have a laminated structure 50 in which a plurality of sets of a dielectric layer (first dielectric layer) 52 and a conductive layer 54 that extend in a belt-like shape along the Y-direction are laminated alternately along the Z-direction. The conductive layers 54 include a first conductive layer 55 that has absorption properties relative to the light of the used light region and a second conductive layer 56 that has reflective properties relative to the light of the used light region. The first conductive layer 55 is provided as the conductive layer 54 closest to the incident side of the light. The light region used in the polarizing plate 10 is mainly the visible wavelength region, which in this description is deemed to represent wavelengths from at least 380 nm to not more than 810 nm.

In the laminated structure 50, seven pairs of the dielectric layer 52 and the conductive layer 54 are laminated in the opposite direction along the Z-direction from the side closest to the main surface 22. The light is incident along the Z-direction, and therefore in the laminated structure 50, among the plurality of conductive layers 54, the conductive layer 54 closest to the tip of the projection 40 is the first conductive layer 55. Further, in the laminated structure 50, one of dielectric layers 52 contacts the main surface 22.

The dielectric layers 52 and the conductive layers 54 are substantially rectangular when viewed from the Y-direction. The widths of the dielectric layers 52 and the conductive layers 54 are substantially equal. In other words, the laminated structure 50 is substantially rectangular when viewed from the Y-direction. The expression "substantially rectangular" means that when moving along the Z-direction, the size across the X-direction is substantially constant, with the variation in the X-direction size along the Z-direction within a range from several nm to about several tens of nm.

The width w50 of the laminated structure 50 and the widths of the dielectric layers 52 and the conductive layers 54 are preferably at least 35 nm but not more than 45 nm. By ensuring that the width w50 falls within this range, the width along the Z-direction can be kept substantially constant, and the transmittance of light polarized along the transmission axis 32 can be enhanced in the used light region. The width w50 can be determined, for example, by using a scanning electron microscope or a transmission electron microscope to measure the width of four random laminated structures 50, and assigning the arithmetic mean of the four measured widths as the width w50. Hereafter, this measurement method is termed the electron microscope method.

The height h52 of each dielectric layer 52 is a height at which the phase of polarized light that is incident upon the polarizing plate 10, passes through the first conductive layer 55 and is reflected by the second conductive layer 56 is shifted by a half wavelength relative to the phase of polarized light that is incident upon the polarizing plate 10 and is reflected by the first conductive layer 55. In order to achieve this half-wavelength shift between the phases, the height h52 is preferably at least 1 nm but not more than 100 nm. The height h55 of the first conductive layer 55 and the height h56 of the second conductive layer 56 are preferably at least 10 nm but not more than 300 nm. The heights h52, h55 and h56 can be measured, for example, using the electron microscope method.

The height of the laminated structure 50 is preferably at least 200 nm but not more than 400 nm. By ensuring that the heights of the dielectric layers 52 and the conductive layers 54 fall within the ranges described above, the transmittance of light polarized along the absorption axis 31 can be reduced in the used light region and the contrast represented by (transmission axis transmittance/absorption axis transmittance) can be increased, meaning a high-quality image can be achieved.

The projections 40 have a dielectric layer (second dielectric layer) 58 that covers the apical surface 61 and side surfaces 62 of the laminated structure 50. The overall projection 40 is also substantially rectangular when viewed from the Y-direction. In other words, the height of the dielectric layer 58 covering the apical surface 61 is substantially uniform, and the width of the second dielectric layer 58 covering the side surfaces 62 is substantially uniform.

The width w40 of each projection 40 is preferably at least 40 nm but not more than 50 nm. By ensuring that the width w40 falls within this range, the width along the Z-direction can be kept substantially constant, and the transmittance of light polarized along the transmission axis 32 can be enhanced in the used light region.

The height h40 of the projections 40 is preferably at least 210 nm but not more than 410 nm. Ensuring that the height h40 falls within this range enables the transmittance of light polarized along the absorption axis 31 to be lowered in the used light region, and is consequently preferred.

The pitch p40 is preferably at least 100 nm but not more than 200 nm. By ensuring that the pitch p40 falls within this range, the ease of manufacture of the projections 40 improves and the shape of the manufactured polarizing plate 10 stabilizes, meaning the optical characteristics of the polarizing plate 10 also stabilize. The pitch p40 can be measured, for example, using the electron microscope method.

Preferred materials for each of the constituent elements of the polarizing plate 10 are described below.

<Transparent Substrate>

The material of the transparent substrate 20 has transparency at least relative to light in the used light region. The total light transmittance of the transparent substrate 20 in the used light region is typically at least 80%, and is preferably at least 85%, and more preferably 90% or higher. The refractive index of the transparent substrate 20 at wavelengths in the used light region is preferably at least 1.1 but not more than 2.2. The material for the transparent substrate 20 is preferably glass, and quartz glass having a refractive index of 1.46 at a reference wavelength of 550 nm and soda lime glass having a refractive index of 1.51 at the same reference wavelength are particularly preferred. Further, the material of the transparent substrate 20 may also be a silicate glass or the like, which is widely used as optical glass.

Further, rock crystal or sapphire, which have high thermal conductivity, can also be used favorably as the material for the transparent substrate 20. By ensuring that the transparent substrate 20 has a refractive index described above and a high thermal conductivity, superior light resistance to intense light can be obtained, and the polarizing plate 10 can be used as the polarizing element for the optical engine of a projector that generates a large amount of heat. In those cases where a transparent substrate formed from an optically active crystal such as rock crystal is used as the material for the transparent substrate 20, the projections 40 are preferably arranged along a direction that extends parallel to or perpendicularly to the optical axis of the crystal. This ensures that when the optical axis is aligned with the polarized light, the polarized light is unaffected by the birefringence and remains in an undisturbed state, meaning excellent optical characteristics can be obtained. The optical axis of the crystal is the axis in a direction for which the difference between the refractive index of an ordinary ray of light and the refractive index of an extraordinary ray of light travelling along that axial direction is smallest.

<Dielectric Layers>

The refractive index of the dielectric layers 52 and 58 at the reference wavelength is preferably greater than 1.0 but not more than 2.5. By appropriate alteration of the height h52, the height and width of the second dielectric layer 58, and the refractive indices of the dielectric layers 52 and 58, a portion of the TE waves incident from the side of the projections 40 and reflected by the second conductive layer 56 can be reflected during transmission through the first conductive layer 55 and returned to the first conductive layer 55. As a result, light that has passed through the first conductive layer 55 can be attenuated by interference. In this manner, by selectively attenuating the TE waves within the light that is incident from the side of the projections 40, the desired polarized light characteristics can be obtained.

Examples of the material of the dielectric layers 52 and 58 include silicon (Si) oxides such as $SiO_2$, metal oxides such as aluminum oxide ($Al_2O_3$), beryllium oxide and bismuth oxide, magnesium fluorides such as $MgF_2$, cryolite, germanium, titanium dioxide, silicon, boron nitride, boron oxide, tantalum oxide and carbon, as well as combinations of two or more of these materials. In terms of being an extremely stable substance that is easy to obtain, the dielectric layers 52 and 58 are preferably composed of a silicon oxide. The materials of the dielectric layers 52 and 58 may be the same material or different materials selected from among the materials listed above.

The dielectric material used as the material of the dielectric layers 52 and 58 is formed as a high-density film using a method such as a vapor deposition method, sputtering method, CVD (Chemical Vapor Deposition) method, ALD (Atomic Layer Deposition) method or SOG (Spin On Glass) method.

<Conductive Layers>

The conductive layers 54 generate the functionality as a wire grid polarizing plate 10 by attenuating TE waves and transmitting TM waves. The optical characteristics of the conductive layers 54 are also affected by the refractive indices of the surrounding dielectric layers 52 and 58. Accordingly, by appropriate selection of the material of the dielectric layers 52 and 58, the characteristics of the polarizing plate 10 generated by the conductive layers 54 can be controlled.

The material of the second conductive layer 56 is a material that has reflective properties relative to the light of the used light region. The expression "has reflective properties" means that the material is able to reflect at least a portion of the incident light. For example, the total light reflectance of the material of the second conductive layer 56 for light of wavelengths in the used light region is preferably at least 85% but not more than 100%, and more preferably at least 90% but not more than 100%. Examples of material that have reflective properties relative to light in the visible wavelength region include elemental simple substances such as Al, Ag, Cu, Mo, Cr, Ti, Ni, W, Fe, Si, Ge and Te, and alloys containing one or more of these elements. Among these materials, the second conductive layer 56 is preferably composed of aluminum or an aluminum alloy, which exhibits a high total light reflectance and also has favorable processability. Using such a material lowers the absorption axis transmittance and increases the transmission axis transmittance, meaning excellent optical characteristics can be obtained. Besides the materials described above, the material of the second conductive layer 56 may also be an inorganic substance or resin on which a high reflectance surface has been formed by coloring or the like.

The material of the first conductive layer 55 is a material that has absorption properties relative to the light of the used light region. The expression "has absorption properties" means that the extinction coefficient is not zero. For example, the extinction coefficient of the material of the first conductive layer 55 for wavelengths in the used light region is preferably at least 0.1 but not more than 5.0. The material of the first conductive layer 55 having a light absorption action may be selected appropriately from among conductive materials such as metal materials and semiconductor materials in accordance with the used light region. Examples of metal materials having a light absorption action in the visible wavelength region include elemental simple substances such as Ta, Al, Ag. Cu. Au, Mo, Cr, Ti, W, Ni, Fe and Sn, and alloys containing one or more of these elements. Examples of semiconductor materials having a light absorption action in the visible wavelength region include Si, Ge, Te, ZnO, and silicide materials (such as β-FeSi$_2$, MgSi$_2$, NiSi$_2$, BaSi$_2$, CrSi$_2$, CoSi$_2$ and TaSi). By using one of the above metal materials or semiconductor materials as the material of the first conductive layer 55, the polarizing plate 10 is able to exhibit a high extinction ratio in the visible wavelength region. In particular, by using a material containing Fe or Ta and Si as the material of the first conductive layer 55, the extinction ratio for the polarizing plate 10 in the visible wavelength region can be further increased.

In those cases where a semiconductor material is used as the material of the first conductive layer 55, because the band gap energy of the semiconductor material contributes to the light absorption action, the absorption edge wavelength of the band gap energy of the semiconductor material must be no higher than the wavelength of the used light region. For example, in order to achieve absorption of light of wavelengths of at least 380 nm but not more than 1.240 nm, a semiconductor material having a band gap of not more than 3.263 eV must be used as the material of the first conductive layer 55.

The first conductive layer 55 and the second conductive layer 56 may each be composed of a plurality of layers formed from mutually different materials selected from among the materials described above.

[Structures of Other Polarizing Elements]

FIG. 1 and FIG. 2 illustrate the polarizing plate 10 of one preferred embodiment of the present invention, which has been described above. In addition to the embodiment described above, other structures that exhibit the actions and effects of the present invention are described below.

Figure 9:
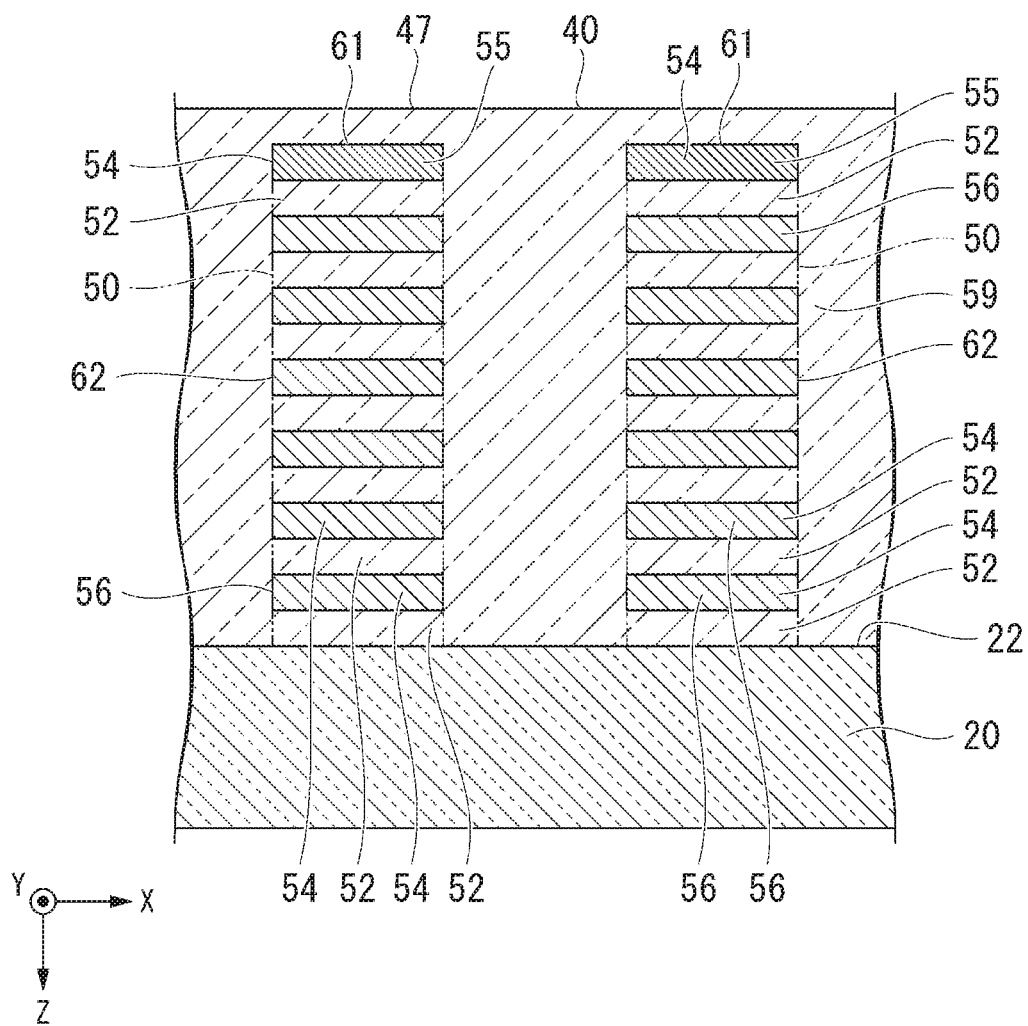
FIG. 9 is a cross-sectional view for describing a method for manufacturing the polarizing element illustrated in FIG. 1.

The projections 40 may contain only the laminated structure 50, and may exclude the dielectric layer 58 (see FIG. 9). In such cases, the width w50 is preferably at least 35 nm but not more than 45 nm.

Figure 3:
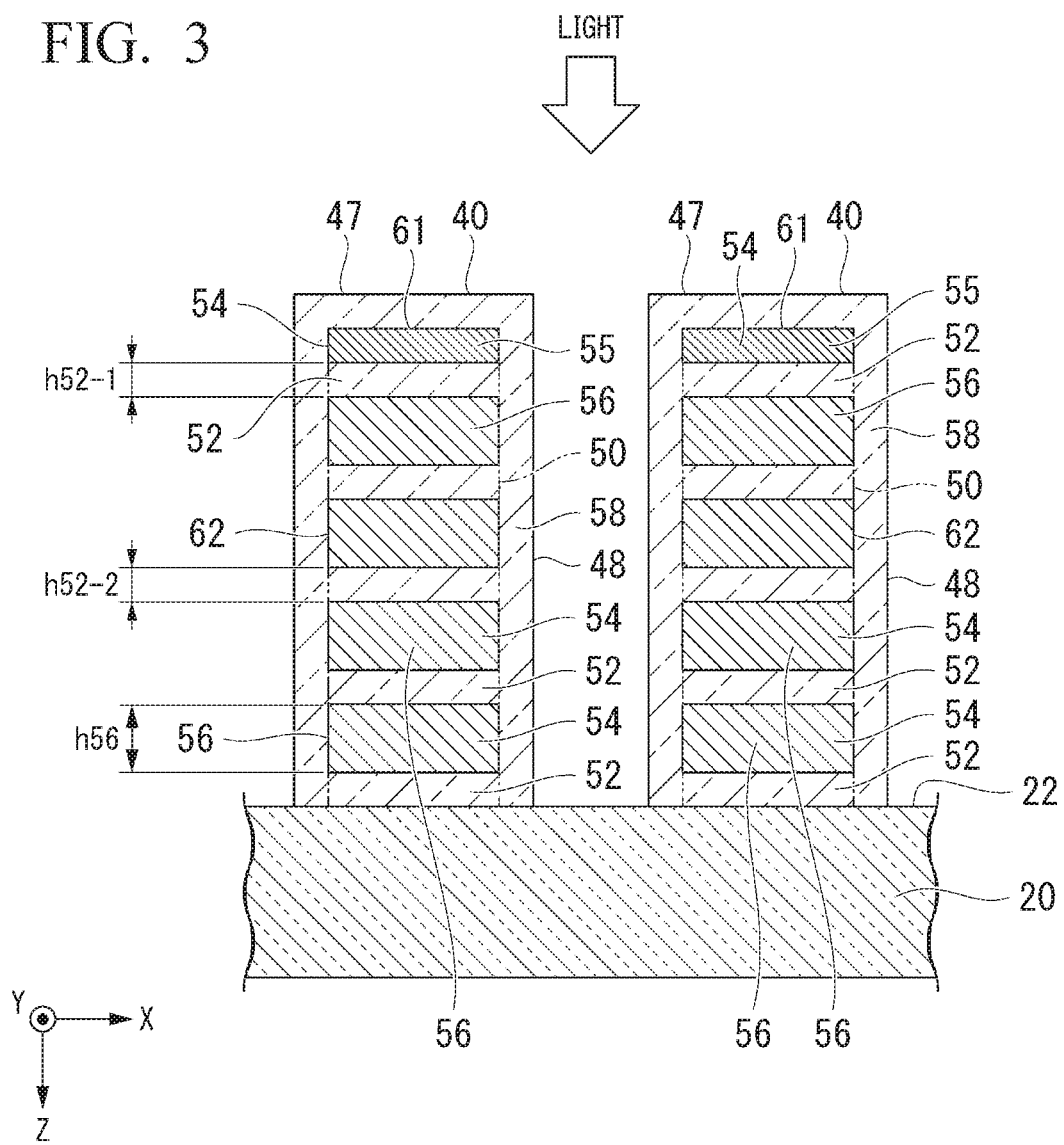
FIG. 3 is a diagram illustrating a modified example of the polarizing element illustrated in FIG. 1, and corresponds with a cross-sectional view cut through a plane including the X-direction and the Z-direction.
Figure 4:
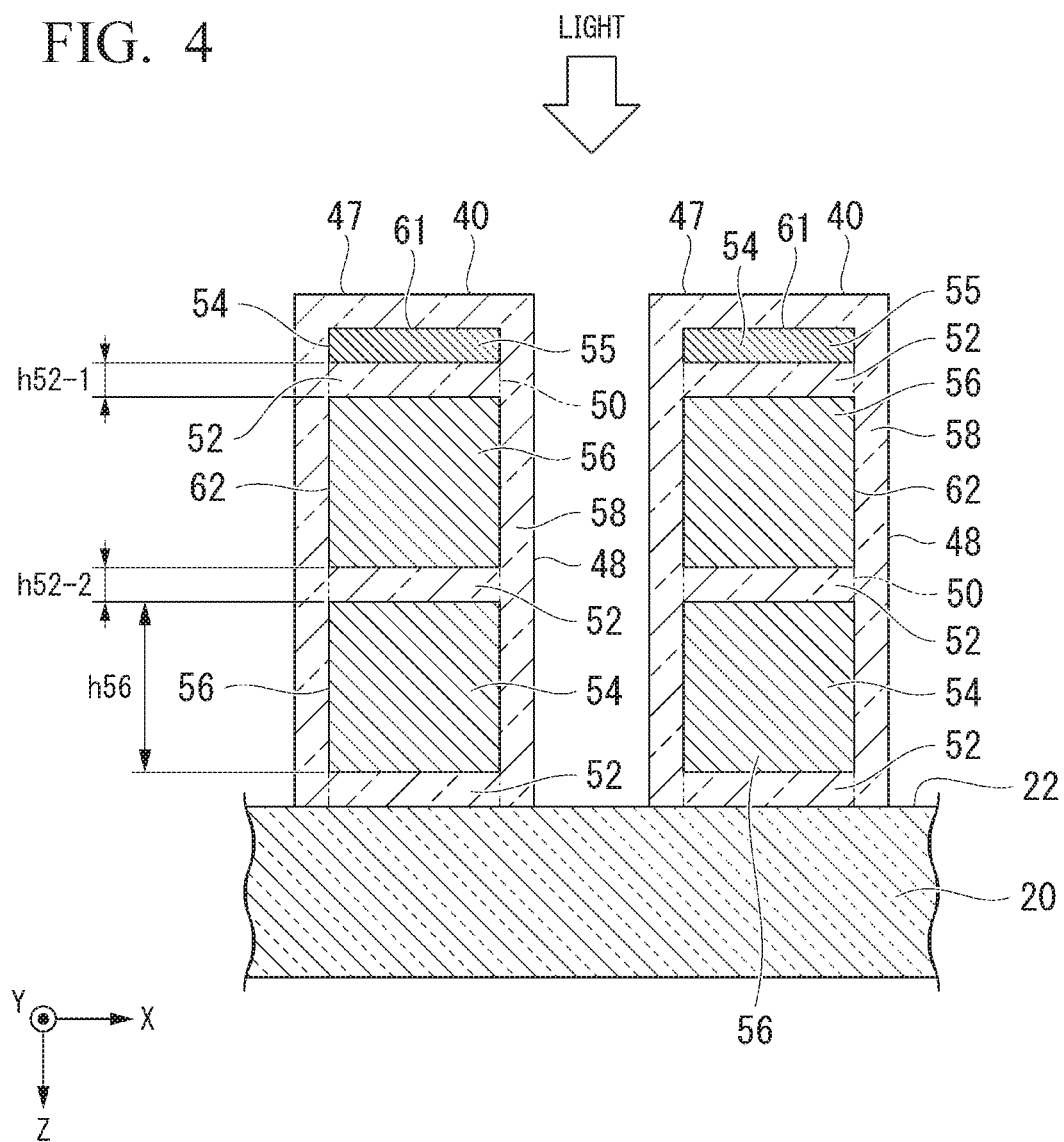
FIG. 4 is a diagram illustrating a modified example of the polarizing element illustrated in FIG. 1, and corresponds with a cross-sectional view cut through a plane including the X-direction and the Z-direction.
Figure 5:
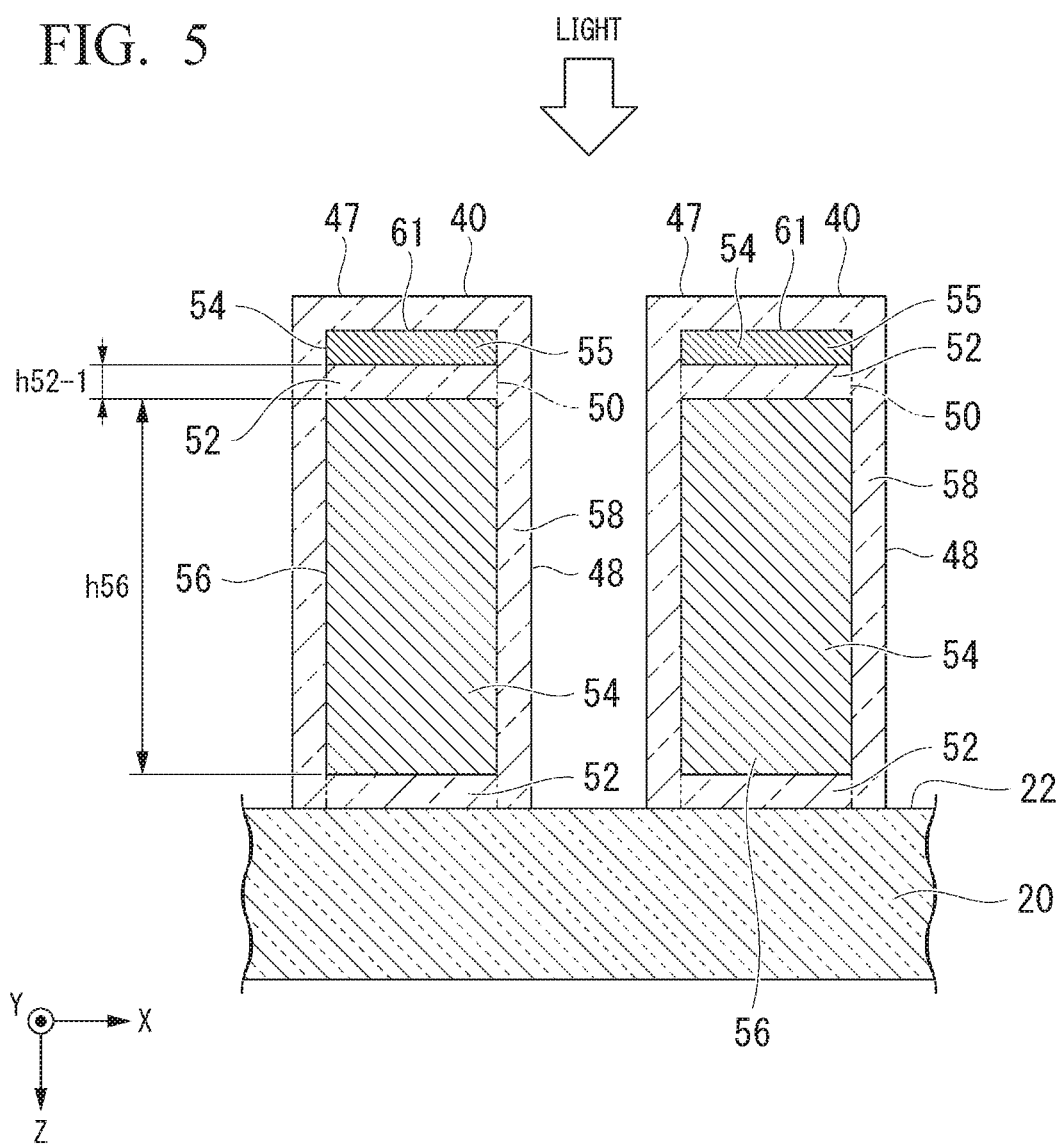
FIG. 5 is a diagram illustrating a modified example of the polarizing element illustrated in FIG. 1, and corresponds with a cross-sectional view cut through a plane including the X-direction and the Z-direction.

Further, the number of conductive layers 54 in the projections 40 is at least two, and is preferably 7 or more. However, provided the desired characteristics can be achieved, the number of conductive layers 54 may be less than 7. FIG. 3 to FIG. 5 illustrate examples of structures in which the number of conductive layers 54 is 5, 3 and 2 respectively.

Furthermore, by increasing the height h52-2 in the Z-direction of the dielectric layer 52 between adjacent second conductive layers 56 or between the second conductive layer 56 and the transparent substrate 20, compared with the height h52-1 in the Z-direction of the dielectric layer 52 between the first conductive layer 55 and the second conductive layer 56, the four effects of transmission, reflection, interference, and selective absorption of polarized light due to optical anisotropy can be enhanced. Provided the desired characteristics can be achieved, the heights h55 and h56 need not be the same. FIG. 3 to FIG. 5 illustrate examples of structures in which the height h56 is greater than the height h55.

Further, although not shown in the drawings, the main surface 22 between adjacent projections 40 in the X-direction, and the apical surface 47 and side surfaces 48 of the projections 40 may be coated with an organic water-repellent film. Examples of this organic water-repellent film include water-repellent films formed from fluorine-based silane compounds such as perfluorodecyltriethoxysilane (FDTS).

Furthermore, although not shown in the drawings, in those cases where the light is incident upon the polarizing plate 10 from the surface on the opposite side from the main surface 22 of the transparent substrate 20, among the plurality of conductive layers 54, at least the conductive layer 54 closest to the main surface 22 becomes the first conductive layer 55, and the conductive layer 54 closest to the tip of the projection 40 is the second conductive layer 56.

[Method for Manufacturing Polarizing Element]

Next is a description of a method for manufacturing a polarizing element according to one embodiment of the present invention. The method for manufacturing a polarizing element according to this embodiment is a method for manufacturing the polarizing plate 10, and includes a first step through to a fourth step described below.

<First Step>

Figure 6:
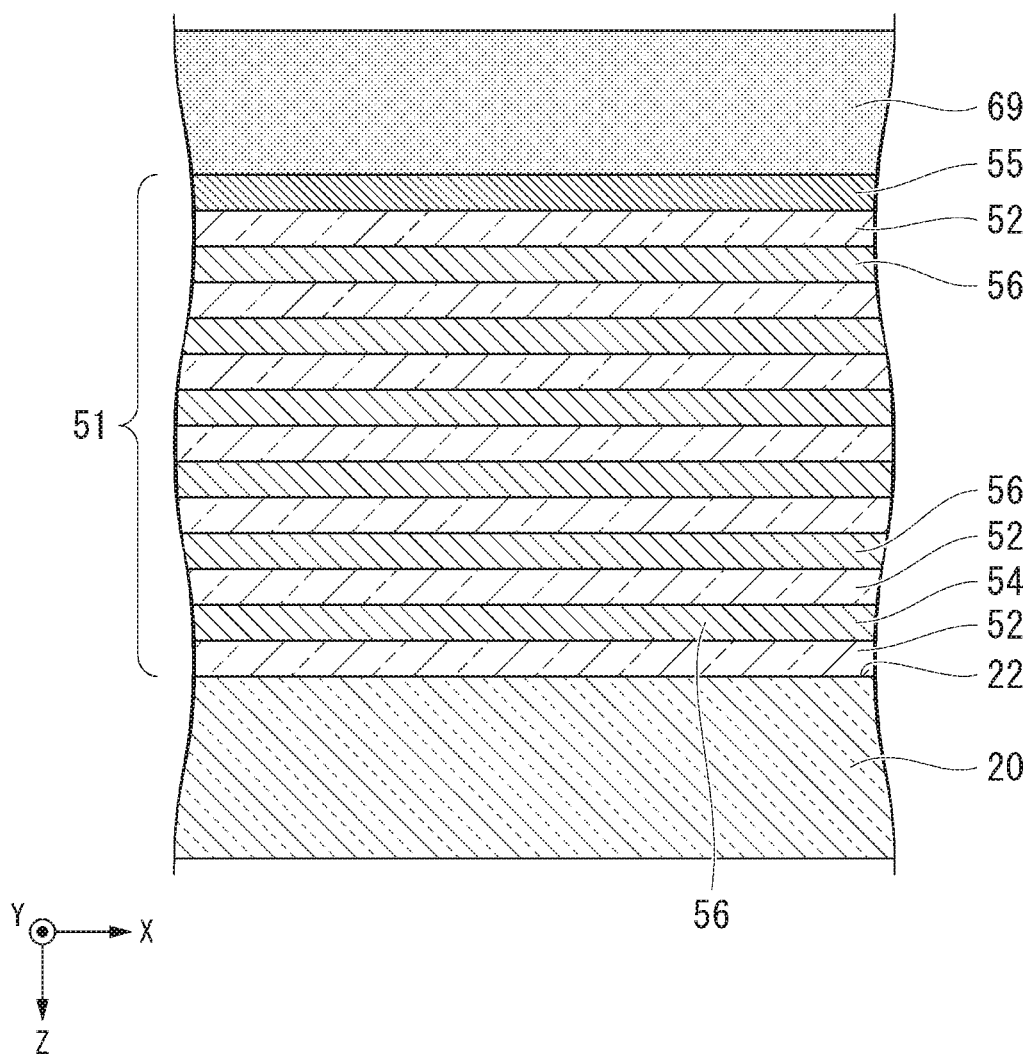
FIG. 6 is a cross-sectional view for describing a method for manufacturing the polarizing element illustrated in FIG. 1.

First, as illustrated in FIG. 6, a laminated structure 51 is formed by alternately laminating dielectric layers 52 and conductive layers 54 on the main surface (on a transparent substrate) 22. Specifically, a dielectric layer 52, a second conductive layer 56, a dielectric layer 52, a second conductive layer 56, a dielectric layer 52, a second conductive layer 56, a dielectric layer 52, a second conductive layer 56, a dielectric layer 52, a second conductive layer 56, a dielectric layer 52, a second conductive layer 56, a dielectric layer 52, and a first conductive layer 55 are formed sequentially on the main surface 22. Examples of the method used for forming each of these layers include sputtering methods, vapor deposition methods, CVD methods, ALD methods and SOG methods.

<Second Step>

Figure 7:
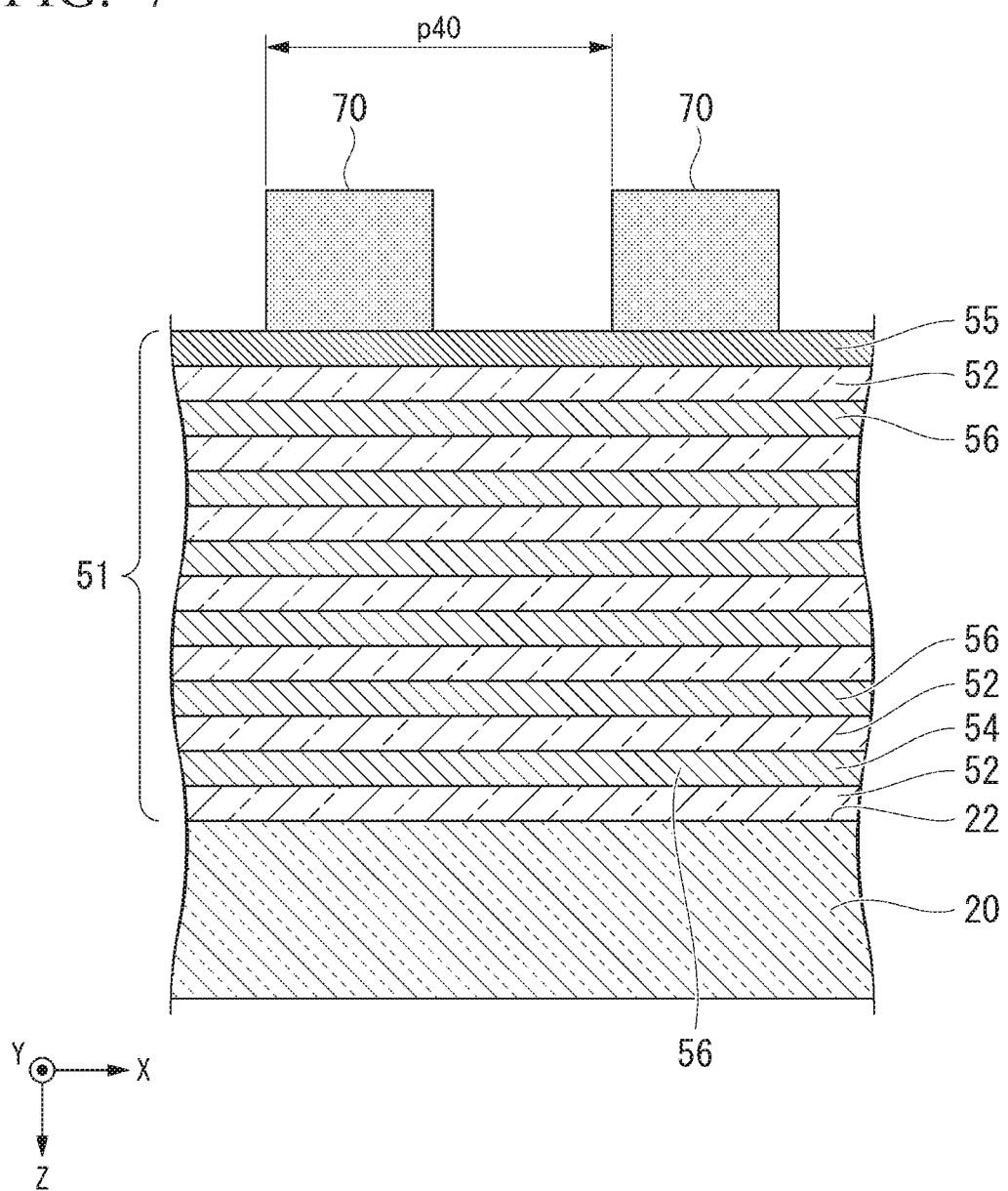
FIG. 7 is a cross-sectional view for describing a method for manufacturing the polarizing element illustrated in FIG. 1.

Next, by selectively etching the laminated structure 51, the laminated structures 50 are formed at a pitch p40. Specifically, as illustrated in FIG. 6, by using a method such as a photolithography method or a nanoimprinting method, a resist 69 is formed on the laminated structure 51 on the upper surface on the opposite side from the main surface 22. Subsequently, the resist 69 is patterned to form resists 70 having a width w50 at a pitch p40, as illustrated in FIG. 7. The resists 70 are formed with the same pitch, width and length as the laminated structures 50. In other words, the resists 70 are provided at a pitch p40, have a width w50, and extend along the Y-direction.

Figure 8:
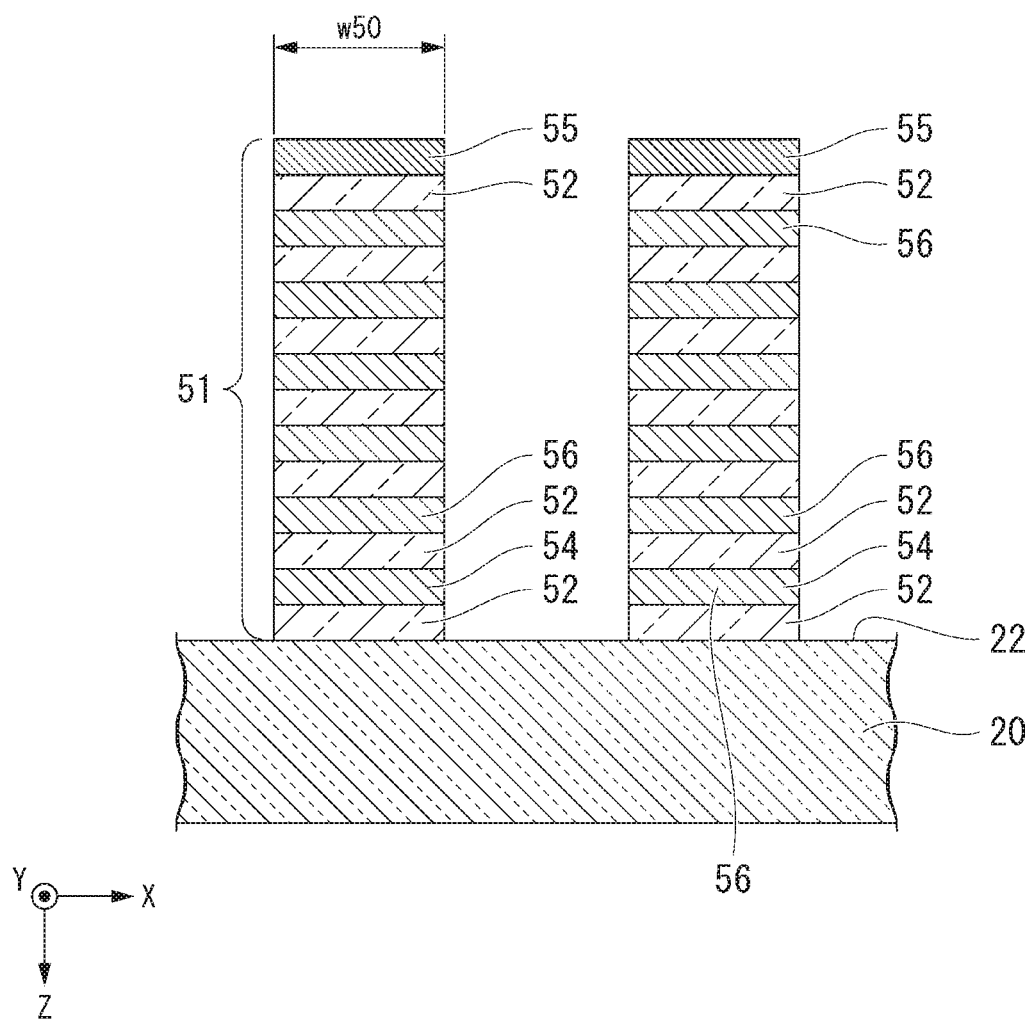
FIG. 8 is a cross-sectional view for describing a method for manufacturing the polarizing element illustrated in FIG. 1.

Next, by selectively etching the laminated structure 51 using the resists 70 as a mask, laminated structures 50 are formed on the main surface 22, as illustrated in FIG. 8. Examples of the method used for forming the laminated structures (projection-like laminated structures) 50 in this manner include dry etching methods using an etching gas appropriate for the dielectric layers 52 and the conductive layers 54.

<Third Step>

Next, as illustrated in FIG. 9, the laminated structures 50 are embedded in a dielectric material 59 composed of the same material as the dielectric layer 58. Examples of the method used for embedding the laminated structures 50 in the dielectric material 59 include sputtering methods, vapor deposition methods, CVD methods, ALD methods and SOG methods.

<Fourth Step>

Figure 10:
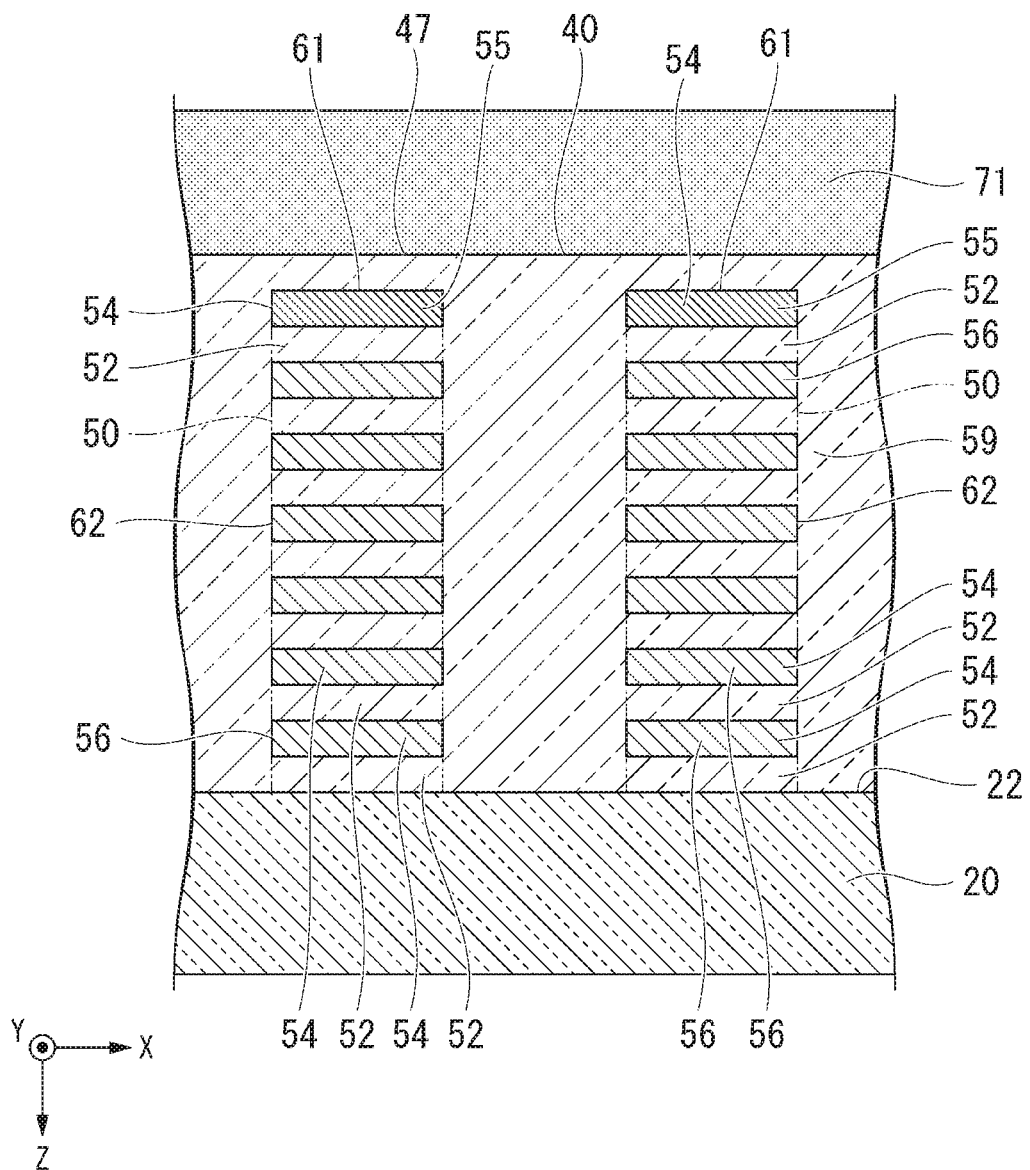
FIG. 10 is a cross-sectional view for describing a method for manufacturing the polarizing element illustrated in FIG. 1.
Figure 11:
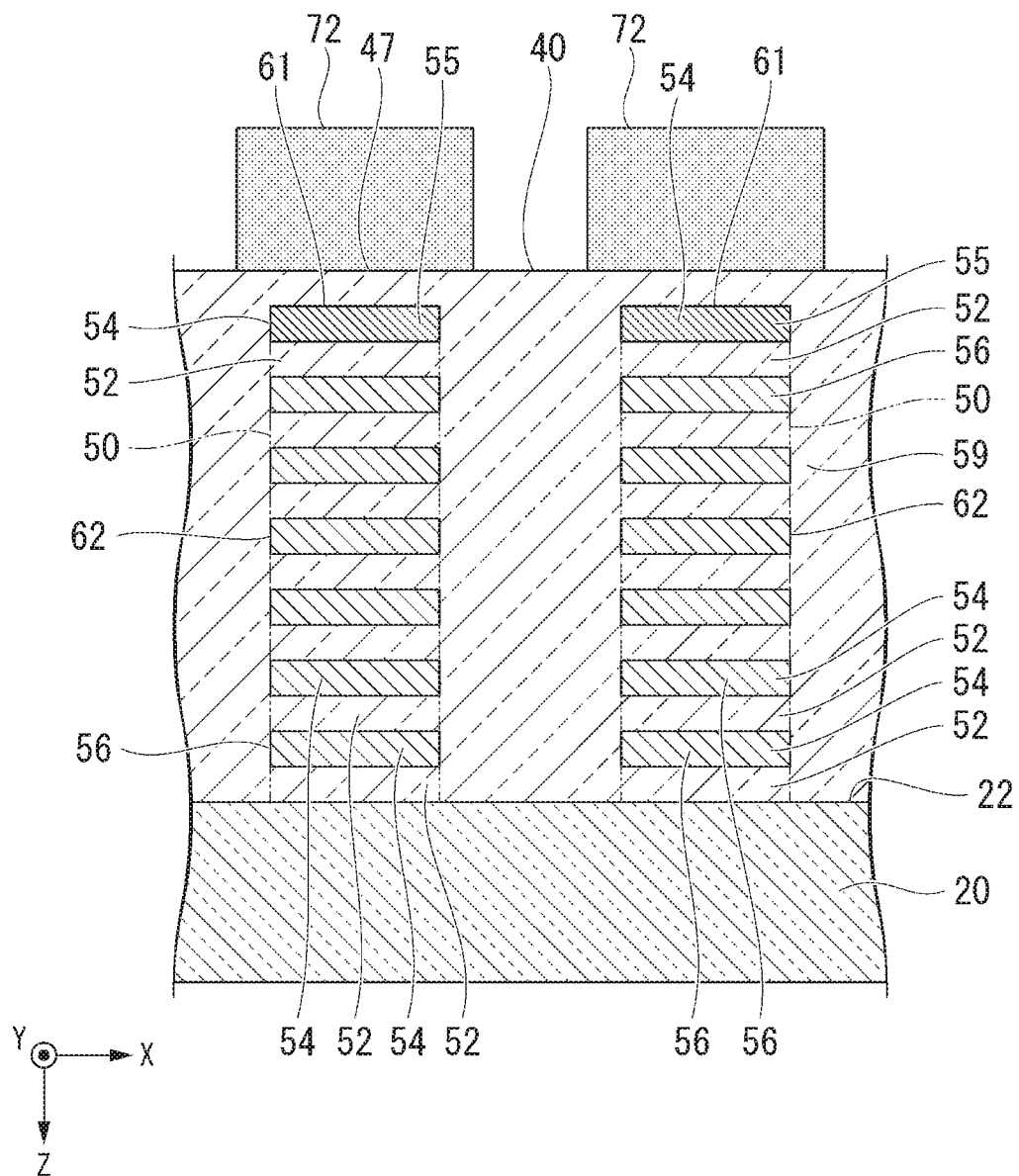
FIG. 11 is a cross-sectional view for describing a method for manufacturing the polarizing element illustrated in FIG. 1.

Next, projections 40 are formed at a pitch p40 by selectively etching the dielectric material 59. Specifically, as illustrated in FIG. 10, a method such as a photolithography method or a nanoimprinting method is used to apply a resist 71 to the upper surface of the dielectric material 59 on the opposite side from the main surface 22. Subsequently, the resist 71 is patterned to form resists 72 having a width w40 at a pitch p40, as illustrated in FIG. 11. The resists 72 are formed to coincide with the shape of the projections 40, and extend along the Y-direction.

Next, by selectively etching the dielectric material 59 using the resists 72 as a mask, the projections 40 illustrated in FIG. 2 are formed on the main surface 22. Examples of the method used for forming the projections 40 in this manner include dry etching methods using an etching gas appropriate for the dielectric material 59.

By following the above steps, the polarizing plate 10 illustrated in FIG. 1 and FIG. 2 is produced. The method for manufacturing a polarizing element of this embodiment may also include, after the fourth step, a step of coating the main surface 22 between adjacent projections 40 in the X-direction, and the apical surface 47 and side surfaces 48 of the projections 40 with an organic water-repellent film. The organic water-repellent film can be formed, for example, using the types of vacuum deposition techniques described above.

[Optical Apparatus]

Next is a description of an optical apparatus of the present invention. Although not shown in the drawings, an optical apparatus of the present invention contains a polarizing element of the present invention typified by the polarizing plate 10. The polarizing element of the present invention can be used in a wide variety of applications. Examples of optical apparatuses in which the polarizing element of the present invention can be used include liquid crystal projectors, head-up displays, and digital cameras and the like. In other words, examples of the optical apparatus of the present invention include liquid crystal projectors, head-up displays, and digital cameras and the like that contain the polarizing element of the present invention. In particular, because the polarizing element of the present invention exhibits excellent heat resistance, the polarizing element can be used particularly favorably in liquid crystal projectors and head-up displays and the like which require superior heat resistance to that provided by organic polarizing plates formed from organic materials.

As described above, the polarizing plate 10 of an embodiment of the present invention is a polarizing element having a wired grid structure, and includes the transparent substrate 20 and the projections 40 that extend along the Y-direction and are arrayed across the main surface 22 at a pitch p40. The projections 40 have the laminated structure 50 composed of the dielectric layers 52 and the conductive layers 54 laminated alternately in the opposite direction along the Z-direction. The conductive layers 54 include the first conductive layer 55 that has absorption properties relative to the light incident on the polarizing plate 10, and the second conductive layer 56 that has reflective properties relative to the light incident on the polarizing plate 10. The first conductive layer 55 is provided as the conductive layer 54 closest to the incident side of the light.

By adopting the structure described above, at least a portion of the TE waves incident upon the polarizing plate 10 from the side of the projections 40 is absorbed by the first conductive layer 55, and the remaining TE waves that pass through the first conductive layer 55 can be reflected by the second conductive layer 56 and returned to the first conductive layer 55. Because the conductive layers 54 include two types of layers, namely the first conductive layer 55 and the second conductive layer 56, the four effects of transmission, reflection, interference, and selective absorption of polarized light due to optical anisotropy can be utilized, and the light interference effect can be particularly strengthened. Consequently, when light that is polarized along the absorption axis 31 is incident upon the polarizing plate 10, this polarized light can be favorably attenuated. As a result, the transmittance of light polarized along the transmission axis 32 can be increased and the reflectance of light polarized along the absorption axis 31 can be lowered, without having to adjust the pitch p40, the width w50 and the height h40.

Further, in the polarizing plate 10, the projections 40 have the dielectric layer 58 that coats the apical surface 47 and the side surfaces 48 of the laminated structure 50. In the projections 40, by coating the side surfaces including the dielectric layers 52 and apical surface with the dielectric layer 58, the laminated structure 50 can be reinforced, and therefore even if the width w50 is narrowed relative to the height of the laminated structure 50, the reliability during manufacture can be enhanced, and the impact resistance of the polarizing plate 10 can be improved.

Furthermore, in the polarizing plate 10, the number of conductive layers 54 in the projections 40 is seven or more. As a result, the aforementioned four effects of transmission, reflection, interference, and selective absorption of polarized light due to optical anisotropy can be enhanced, meaning that when light that is polarized along the absorption axis 31 is incident upon the polarizing plate 10, this polarized light can be better attenuated. The transmittance of light polarized along the transmission axis 32 increases as the number of conductive layers 54 is increased, but because the number of lamination repetitions for the conductive layer 54 also increases, the manufacturing process becomes more complex. Accordingly, the number of conductive layers 54 is preferably set with due consideration of the performance and the like of the manufacturing equipment.

Furthermore, in the polarizing plate 10, the projections 40 have a substantially rectangular shape when viewed from the Y-direction, and the dielectric layers 52 and the conductive layers 54 also have substantially rectangular shapes when viewed from the Y-direction. In this manner, by ensuring that the width w40 is substantially constant along the Z-direction, a complex resist pattern shape or fine control of the etching gas is not required during formation of the projections 40. Moreover, the width w40 can be kept relatively broad compared with conventional polarizing plates having narrow grid widths while still maintaining high transmittance of light polarized along the transmission axis 32 and reduced reflectance of light polarized along the absorption axis 31.

Furthermore, in the polarizing plate 10, the material of the second conductive layer 56 may be a metal, and the metal may be aluminum or an aluminum alloy. This enables superior optical characteristics to be obtained.

Further, in the polarizing plate 10, the material of the transparent substrate 20 may be any one of glass, rock crystal or sapphire. This enables the transmittance of light from the visible wavelength region incident upon the polarizing plate 10 to be increased.

Furthermore, in the polarizing plate 10, the material of the dielectric layers 52 and 58 may be a silicon oxide. This enables superior optical characteristics to be obtained.

Further, in the polarizing plate 10, the first conductive layer 55 may contain silicon, as well as containing iron or tantalum. This enables superior optical characteristics to be obtained.

Moreover, in the polarizing plate 10, the main surface 22, the apical surface 47 and the side surfaces 48 may be coated with an organic water-repellent film. This enables the reliability of the polarizing plate 10 such as the moisture resistance to be enhanced.

The method for manufacturing a polarizing element according to the present invention is a method for manufacturing the polarizing plate 10 having a wire grid structure, the method having a first step of forming the laminated structure 51 on the transparent substrate 20, a second step of selectively etching the laminated structure 51 to form the laminated structures 50 arrayed on the transparent substrate at a pitch p40, a third step of embedding the laminated structures 50 in the dielectric material 59, and a fourth step of selectively etching the dielectric material 59 to form the projections 40 at a pitch p40. By using this method for manufacturing a polarizing element, a polarizing plate 10 can be manufactured in which the width w40 is kept relatively broad compared with conventional polarizing plates having narrow grid widths while still maintaining high transmittance of light polarized along the transmission axis 32 and reduced reflectance of light polarized along the absorption axis 31.

An optical apparatus of the present invention contains a polarizing element of the present invention typified by the polarizing plate 10. This enables an increase in the brightness of optical apparatuses using light polarized along the transmission axis 32.

While preferred embodiments of the invention have been described, the present invention is not limited to these specific embodiments. Various modifications may be made within the scope of the present invention disclosed in the claims.

For example, the shape of the transparent substrate 20 need not necessarily be a flat plate shape, and may have any arbitrary shape, with the plurality of projections 40 provided on a portion of the substrate surface that acts as the main surface 22.

EXAMPLES

Figure 12:
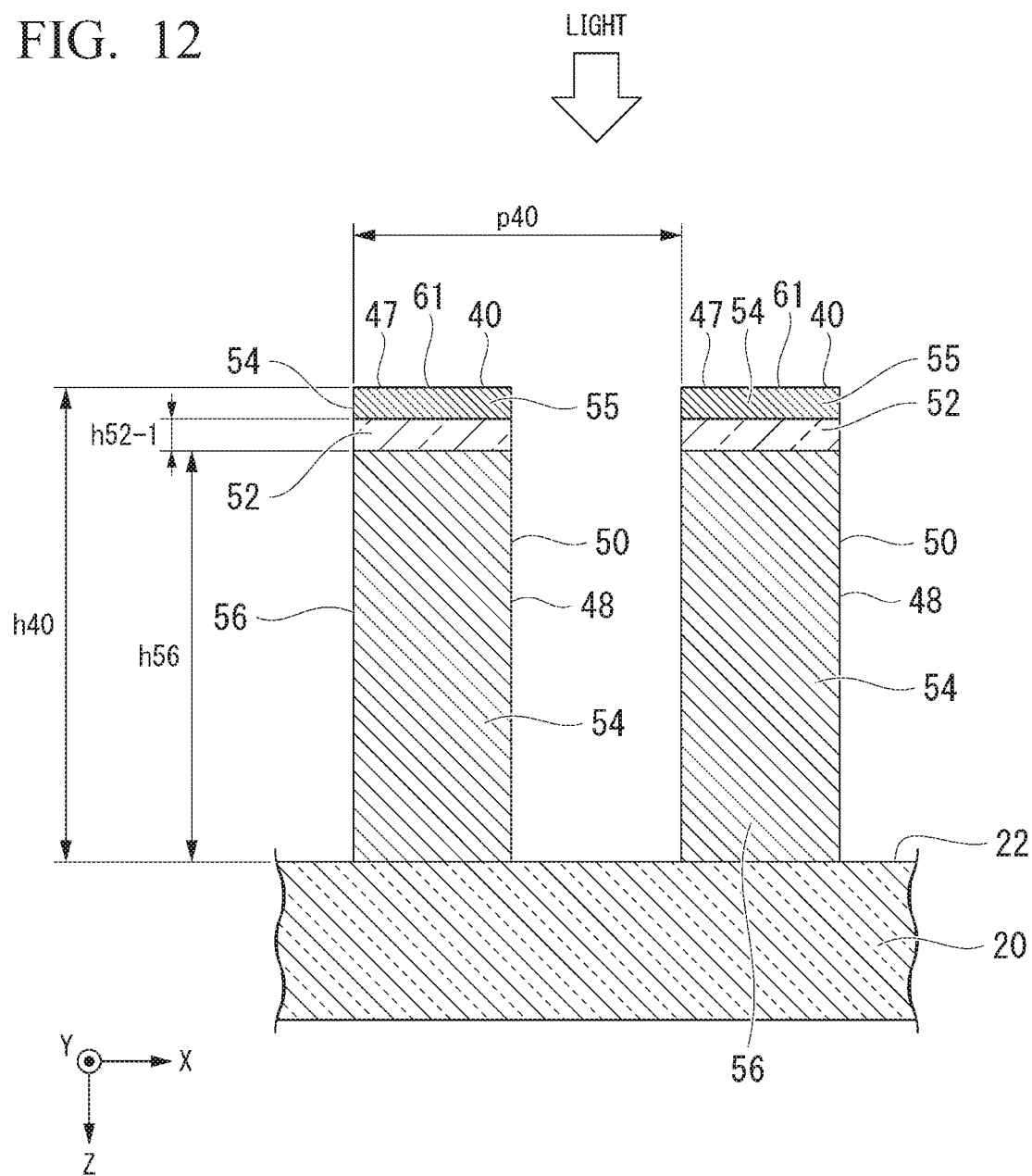
FIG. 12 is a diagram illustrating a polarizing element of a comparative example, and corresponds with a cross-sectional view cut through a plane including the X-direction and the Z-direction.

The polarizing plate 10 and modified examples thereof illustrated in FIG. 2 to FIG. 5 were used as Example 1 to Example 4 respectively of the polarizing element of the present invention, and a simulation of the optical characteristics of each element was performed. Further, for comparative purposes, a simulation of the optical characteristics was also performed for a conventional polarizing element in which, as illustrated in FIG. 12, the projections 40 were composed solely of the laminated structure 50, and the number of conductive layers 54 was two. Simulation of the optical characteristics was performed using a simulator GSolver (manufactured by Grating Solver Development Co.) based on an electromagnetic field simulation conducted using Rigorous Coupled Wave Analysis (RCWA).

In order to perform the simulations for the optical characteristics of Examples 1 to 4 and the comparative example, the conditions described below were set. The refractive index in the following conditions represents the refractive index at the aforementioned reference wavelength of 550 nm. Further, the material of the dielectric layers 52 and 58 was assumed to be $SiO_2$. The material of the first conductive layer 55 was assumed to be FeSi. The material of the second conductive layer 56 was assumed to be simple aluminum.

Figure 13:
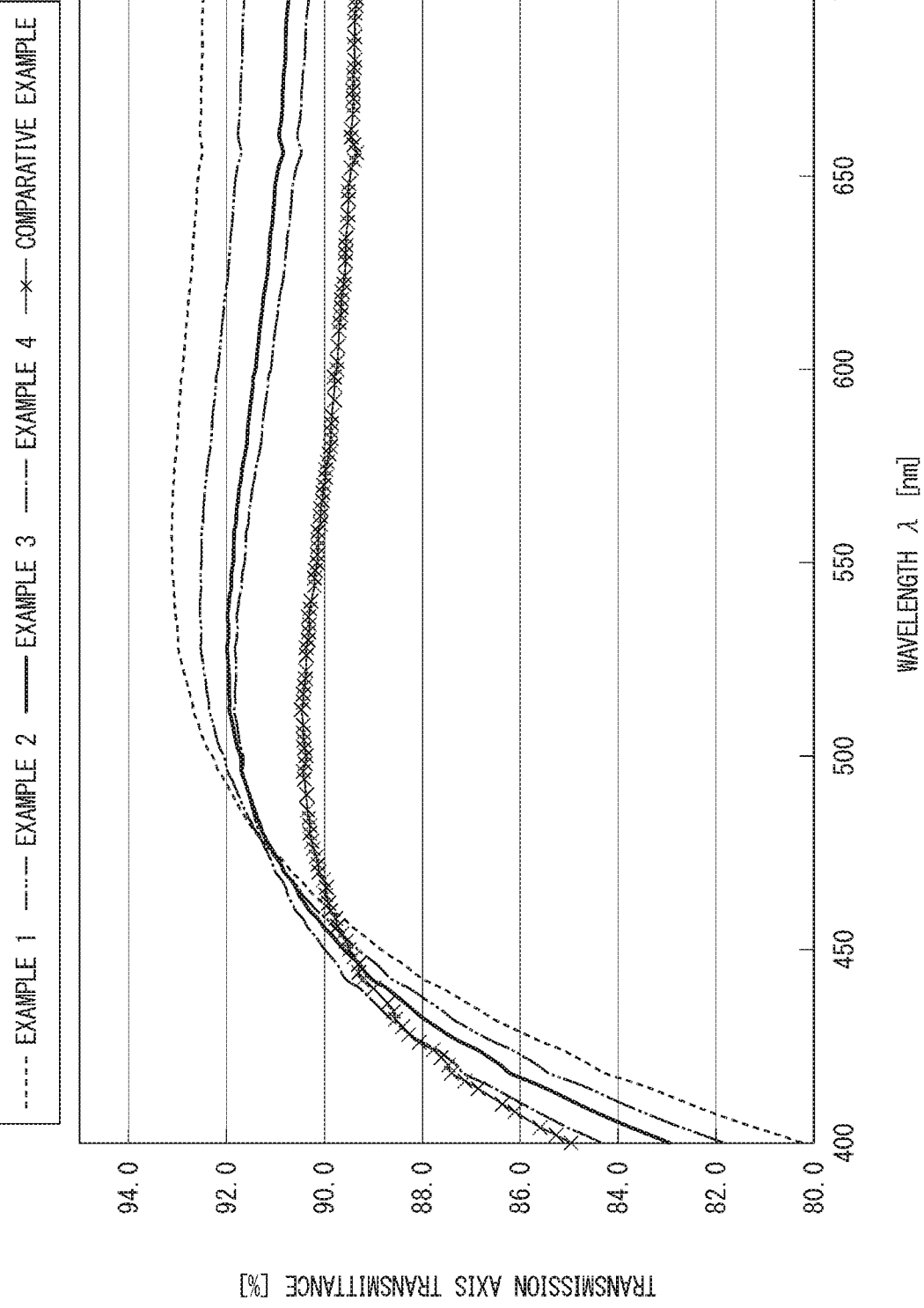
FIG. 13 is graph illustrating the wavelength dependency of the transmission axis transmittance for polarizing plates of Examples 1 to 4 and a comparative example.

Conditions common to Examples 1 to 4 and the comparative example
Refractive index of transparent substrate 20: 1.5
Pitch p40: 141 nm
Height h40: 315 nm
Width w50: 35 nm
Refractive index of Dielectric layer 52: 1.46
Height h55: 25 nm
Refractive index of first conductive layer 55: 4.03
Refractive index of second conductive layer 56: 0.74
Height h52-1 of dielectric layer 52: 5 nm
Conditions common to Examples 1 to 4
Height h52-2 of dielectric layer 52: 20 nm
Height of dielectric layer 58 on apical surface 61: 15 nm
Width of dielectric layer 58 on side surfaces 62: 2.5 nm
Refractive index of dielectric layer 58: 1.46
Example 1 (see FIG. 2)
Height h56: 25 nm
Example 2 (see FIG. 3)
Height h56: 47.5 nm
Example 3 (see FIG. 4)
Height h56: 115 nm
Example 4 (see FIG. 5)
Height h56: 250 nm
Comparative Example (see FIG. 12)
Height h56: 285 nm FIG. 13 is a graph illustrating the wavelength dependency of the transmittance of light polarized along the transmission axis 32 (hereafter also referred to as the "transmission axis transmittance") in the visible wavelength region for polarizing plates of Examples 1 to 4 and a comparative example. The horizontal axis in FIG. 13 indicates the wavelength (nm). The vertical axis in FIG. 13 indicates the transmission axis transmittance (%). As illustrated in FIG. 13, on the long wavelength side from about 460 nm, the transmission axis transmittance of the polarizing plates of Examples 1 to 4 increased. Further, by increasing the number of sets of the dielectric layer 52 and the conductive layer 54, the transmission axis transmittance increased further. In particular, when the number of conductive layers 54 reached seven or more, the transmission axis transmittance was at least 93%, which is particularly desirable. In contrast, although the polarizing plate of the comparative example had two conductive layers 54, it did not include a plurality of sets of alternately arranged dielectric layers 52 and conductive layers 54. Consequently, in the polarizing plate of the comparative example, the four effects of transmission, reflection, interference, and selective absorption of polarized light due to optical anisotropy were not fully utilized, the light interference effect weakened, and the transmission axis transmittance decreased compared with the transmission axis transmittance of Examples 1 to 4. In Examples 1 to 4, it is thought that by making the height h52-2 four times that of the height h52-1, the four effects of transmission, reflection, interference, and selective absorption of polarized light due to optical anisotropy were able to be further enhanced.

Figures 14, 15:
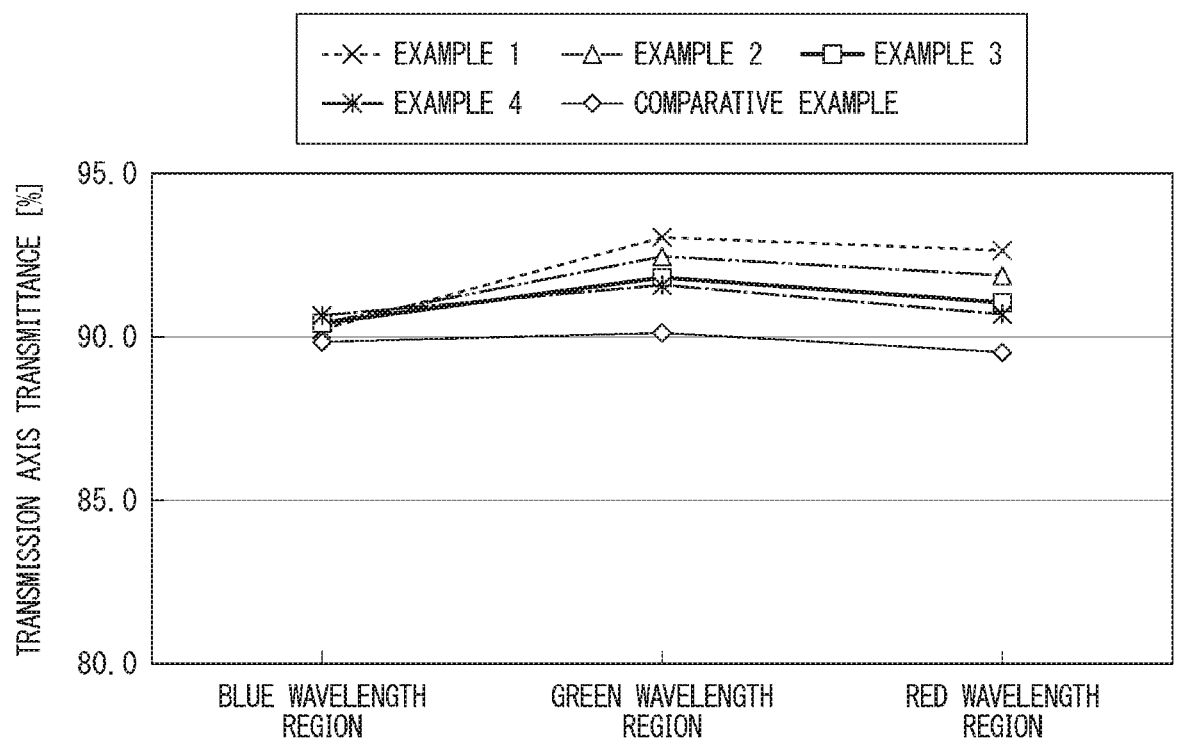
FIG. 14 is a graph illustrating the average values for the transmission axis transmittance of the blue wavelength region, the green wavelength region and the red wavelength region for polarizing plates of Examples 1 to 4 and a comparative example.
FIG. 15 is a table illustrating the average values for the transmission axis transmittance of the blue wavelength region, the green wavelength region and the red wavelength region for polarizing plates of Examples 1 to 4 and a comparative example.

FIG. 14 and FIG. 15 are a graph and a table respectively illustrating the average values for the transmission axis transmittance for each of the blue wavelength region (wavelength: 430 to 510 nm), the green wavelength region (wavelength: 520 to 590 nm) and the red wavelength region (wavelength: 600 to 680 nm) for polarizing plates of Examples 1 to 4 and the comparative example. As illustrated in FIG. 14 and FIG. 15, increasing the number of layers was confirmed to increase the transmission axis transmittance in the visible wavelength region. In particular, it was confirmed that excellent optical characteristics were able to be obtained in the green wavelength region (wavelength: 520 to 590 nm) through to the red wavelength region (wavelength: 600 to 680 nm).

DESCRIPTION OF THE REFERENCE SIGNS

10: Polarizing plate (polarizing element)
20: Transparent substrate
22: Main surface (surface)
40: Projection
52: Dielectric layer (first dielectric layer)
54: Conductive layer
55: First conductive layer
56: Second conductive layer
Y: direction (first direction)
Z: direction (second direction)

What is claimed is:

1. A polarizing element having a wire grid structure, the polarizing element comprising:
a transparent substrate, and projections, which are arrayed on a surface of the transparent substrate at a pitch that is narrower than a wavelength of a light in a used light region, and extend in a first direction along the surface, wherein
the projections have a laminated structure in which a plurality of sets of a first dielectric layer and a conductive layer are laminated alternately along a second direction orthogonal to the surface,
a first surface of one of the first dielectric layer contacts the surface of the transparent substrate,
in the laminated structure, a first conductive layer having absorption properties relative to the light and a second conductive layer having reflective properties relative to the light are each identified as the conductive layer,
the first conductive layer is provided as the conductive layer closest to an incident side of the light, and
the second conductive layer contacts a second surface of the one of the first dielectric layer, wherein a second surface of the one of the first dielectric layer is an opposite surface of the first surface contacting the surface of the transparent substrate.

2. The polarizing element according to claim 1, wherein the projections have a second dielectric layer that covers an apical surface and side surfaces of the laminated structure.

3. The polarizing element according to claim 2, wherein a material of the second dielectric layer is a silicon oxide.

4. The polarizing element according to claim 1, wherein a material of the second conductive layer is a metal.

5. The polarizing element according to claim 4, wherein the metal is aluminum or an aluminum alloy.

6. The polarizing element according to claim 1, wherein a number of conductive layers in the projections is 7 or greater.

7. The polarizing element according to claim 1, wherein the projections have a substantially rectangular shape when viewed from the first direction.

8. The polarizing element according to claim 1, wherein the first dielectric layer and the conductive layer each have a substantially rectangular shape when viewed from the first direction.

9. The polarizing element according to claim 1, wherein a material of the transparent substrate is any one of glass, rock crystal and sapphire.

10. The polarizing element according to claim 1, wherein a material of the first dielectric layer is a silicon oxide.

11. The polarizing element according to claim 1, wherein the first conductive layer comprises silicon, as well as iron or tantalum.

12. The polarizing element according to claim 1, wherein a surface of the transparent substrate and an apical surface and side surfaces of the projections are coated with an organic water-repellent film.

13. An optical apparatus comprising the polarizing element according to claim 1.

14. The polarizing element according to claim 1, wherein a thickness of the dielectric layer provided between the second conductive layer and the transparent substrate adjacent to each other is higher than a thickness of the dielectric layer provided between the first conductive layer and the second conductive layer adjacent to each other.

15. The polarizing element according to claim 1, wherein a thickness of the dielectric layer provided between adjacent second conductive layers is higher than a thickness of the dielectric layer provided between the first conductive layer and the second conductive layer adjacent to each other.

16. A method for manufacturing a polarizing element having a wire grid structure, the method comprising:
a step of forming a laminated structure in which a plurality of sets of a conductive layer and a first dielectric layer are laminated alternately on a surface of a transparent substrate,
a step of selectively etching the laminated structure to form projection-like laminated structures that are arrayed on the surface of the transparent substrate at a pitch that is narrower than a wavelength of light in a used light region and are composed of the plurality of sets of the conductive layer and the first dielectric layer which are laminated alternately,
a step of embedding the projection-like laminated structures within a dielectric material, and
a step of selectively etching the dielectric material to form projections having second dielectric layers that cover a plurality of sets of an apical surface and side surfaces of the projection-like laminated structures, wherein the projections are arrayed on the transparent substrate at a pitch that is narrower than a wavelength of light in a used light region.

* * * * *